United States Patent
Kanzaki

(10) Patent No.: US 8,450,400 B2
(45) Date of Patent: May 28, 2013

(54) POLYPROPYLENE RESIN COMPOSITION AND MOLDED ARTICLE MADE THEREOF

(75) Inventor: Susumu Kanzaki, Kisarazu (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 140 days.

(21) Appl. No.: 12/808,701

(22) PCT Filed: Dec. 22, 2008

(86) PCT No.: PCT/JP2008/073900
§ 371 (c)(1),
(2), (4) Date: Jun. 17, 2010

(87) PCT Pub. No.: WO2009/082023
PCT Pub. Date: Jul. 2, 2009

(65) Prior Publication Data
US 2010/0292392 A1 Nov. 18, 2010

(30) Foreign Application Priority Data
Dec. 21, 2007 (JP) ................................ 2007-329886

(51) Int. Cl.
*C08K 5/34* (2006.01)
(52) U.S. Cl.
USPC .............................. 524/99; 524/102; 524/505

(58) Field of Classification Search
USPC .......................................... 524/99, 102, 505
See application file for complete search history.

(56) References Cited

U.S. PATENT DOCUMENTS

| | | | |
|---|---|---|---|
| 2005/0006628 A1 * | 1/2005 | Gugumus | 252/400.52 |
| 2010/0292371 A1 * | 11/2010 | Maruyama et al. | 524/99 |
| 2010/0298473 A1 * | 11/2010 | Yokota et al. | 524/99 |

* cited by examiner

*Primary Examiner* — Peter D Mulcahy
(74) *Attorney, Agent, or Firm* — Panitch Schwarze Belisario & Nadel LLP

(57) ABSTRACT

Provided are a polypropylene resin composition which does not produce very much mold staining at the time of molding, which is excellent in antistatic property, weather resistance and molding processability, which has good balance between high rigidity and high impact resistance, and which can give a molded article excellent in flow mark appearance and weld appearance when being processed into a molded article, and a molded article produced therefrom. The polypropylene resin composition of the present invention contains 98 to 50 parts by weight of a specified polypropylene resin (A), 1 to 25 parts by weight of a specified ethylene-α-olefin copolymer rubber (B), 1 to 25 parts by weight of an inorganic filler (C), 0.02 to 1 part by weight of a hindered amine light stabilizer (D) which satisfies specified requirements (a), (b) and (c), and 0.05 to 1 part by weight of a nonionic antistatic agent (E), provided that the combined amount of the polypropylene resin (A), the ethylene-α-olefin copolymer rubber (B) and the inorganic filler (C) is 100 parts by weight.

11 Claims, No Drawings

POLYPROPYLENE RESIN COMPOSITION AND MOLDED ARTICLE MADE THEREOF

CROSS-REFERENCE TO RELATED APPLICATION

This application is a section 371 of International Application No. PCT/JP2008/073900, filed Dec. 22, 2008, which was published in the Japanese language on Jul. 2, 2009 under International Publication No. WO 2009/082023 A1 and the disclosure of which is incorporated herein by reference.

TECHNICAL FIELD

The present invention relates to polypropylene resin compositions and molded articles made thereof.

BACKGROUND ART

Polypropylene resin compositions are materials excellent in rigidity, impact resistance, etc, and they, therefore, are used in a wide variety of applications in the form of molded articles such as automotive interior or exterior components and housings of electric appliances. It is known that polypropylene resins are used with incorporation of a heat resistance stabilizer, a weathering stabilizer or an antistatic agent according to the performance demanded in the intended application.

On the other hand, a polypropylene resin composition containing such additives may result in occurrence of defective appearance with a product due to accumulation of volatile components on the surface of a mold during its molding process such as injection molding carried out continuously by the use of the mold. In order to cope with such staining of molds, improvement by addition of a specific additive has been made.

For example, Japanese Unexamined Patent Application Publication No. 2002-12720 discloses a polypropylene resin composition containing 0.0 to 0.5% by weight of three kinds of hindered amine light stabilizers each having a specified structure and a specified molecular weight and 0.01 to 0.5 parts by weight of a triarylphosphite type heat resistance stabilizer.

Japanese Unexamined Patent Application Publication No. 10-292072 discloses a polypropylene resin composition comprising 0.01 to 0.2 parts by weight of a hindered phenol antioxidant, 0.01 to 0.3 parts by weight of a weathering agent, 0.01 to 0.2 parts by weight of a fatty acid amide and/or a fatty acid bisamide, and 0.01 to 2.0 parts by weight of an antistatic agent.

Polypropylene resin compositions, however, have been required to be better balanced with respect to antistatic property, weather resistance, and anti-mold staining property at the time of their molding.

DISCLOSURE OF THE INVENTION

The objective of the present invention is to provide a polypropylene resin composition which does not produce mold staining very much at the time of molding, which is excellent in antistatic property, weather resistance, and molding processability, which has good balance between high rigidity and impact resistance, and which can give a molded article excellent in flow mark appearance and weld appearance when being processed into a molded article, and a molded article produced therefrom.

The inventors of the present invention found that a polypropylene resin composition comprising 100 parts by weight in total of a specified polypropylene resin, an ethylene-α-olefin copolymer rubber and an inorganic filler, 0.02 to 1 part by weight of a hindered amine light stabilizer which satisfies specified requirements, and 0.05 to 1 part by weight of a nonionic antistatic agent does not produce very much mold staining at the time of its molding, that the composition is excellent in antistatic property, weather resistance and molding processability and is well-balanced with respect to high rigidity and high impact resistance, and that it is possible to obtain a molded article excellent in flow mark appearance and weld appearance when processing the composition into a molded article. As a result, they have accomplished the present invention.

The present invention provides a polypropylene resin composition comprising:

98 to 50 parts by weight of a polypropylene (A) comprising a propylene-ethylene block copolymer (A-1) or a polymer mixture (A-3) containing a propylene-ethylene block copolymer (A-1) and a propylene homopolymer (A-2), 1 to 25 parts by weight of an ethylene-α-olefin copolymer rubber (B) which comprises an α-olefin having 4 to 12 carbon atoms and ethylene and which has a density of 0.85 to 0.87 g/cm$^3$ and a melt flow rate, measured at a temperature of 230° C. and a load of 2.16 kgf in accordance with JIS K7210, of 0.05 to 20 g/10 min, 1 to 25 parts by weight of an inorganic filler (C), 0.02 to 1 part by weight of a hindered amine light stabilizer (D) which satisfies requirements (a), (b) and (c) given below, and 0.05 to 1 part by weight of a nonionic antistatic agent (E), provided that the combined amount of the polypropylene resin (A), the ethylene-α-olefin copolymer rubber (B) and the inorganic filler (C) is 100 parts by weight:

requirement (a): it has a 2,2,6,6-tetramethylpiperidyl group represented by formula (I);

requirement (b): it has an acid dissociation constant (pka) of less than 8;

requirement (c): the weight loss rate, as measured in an thermogravimetric analysis at a measurement temperature of 300° C. under a nitrogen gas atmosphere, is less than 10% by weight.

MODE FOR CARRYING OUT THE INVENTION

Polypropylene Resin Composition

[Polypropylene Resin (A)]

The polypropylene resin (A) to be used in the present invention contains a propylene-ethylene block copolymer (A-1) or a polymer mixture (A-3) containing a propylene-ethylene block copolymer (A-1) and a propylene homopolymer (A-2).

The propylene-ethylene block copolymer (A-1) is a copolymer containing a polypropylene portion (henceforth, referred to as polymer component (I)) and a propylene-ethylene random copolymer portion (henceforth, referred to as copolymer component (II)).

Considering, for example, the rigidity, the hardness, the toughness, and the impact resistance of a molded article and the molding pocessability of a resin composition, the propylene-ethylene block copolymer (A-1) preferably is a block copolymer containing 55 to 92% by weight of polymer component (I) and 8 to 45% by weight of copolymer component (II), and more preferably is a block copolymer containing 70 to 90% by weight of polymer component (I) and 10 to 30% by weight of copolymer component (II), provided that the overall amount of the block copolymer (A-1) is let be 100% by weight.

The polymer component (I) is a propylene homopolymer or a copolymer of propylene with at least one olefin selected from the group consisting of ethylene and α-olefins having 4 or more carbon atoms. When the polymer component (I) is a copolymer of propylene with at least one olefin selected from the group consisting of ethylene and α-olefins having 4 or more carbon atoms, it is preferable, from the viewpoint of the rigidity, heat resistance or hardness of a molded article, that the content of the at least one olefin selected from the group consisting of ethylene and α-olefins having 4 or more carbon atoms be 1 mol % or less, provided that the overall amount of the copolymer of propylene with at least one olefin selected from the group consisting of ethylene and α-olefins having 4 or more carbon atoms is let be 100 mol %.

Considering the rigidity, heat resistance and hardness of a molded article, the polymer component (I) preferably is a propylene homopolymer, and more preferably is a propylene homopolymer having an isotactic pentad fraction (this may be henceforth referred to as mmmm fraction), measured by $^{13}$C-NMR, of 0.97 or more. A propylene homopolymer having an isotactic pentad fraction of 0.98 or more is more preferable.

The isotactic pentad fraction is a fraction of units derived from propylene monomers which are each present at the center of an isotactic chain in the form of a pentad unit, namely a chain in which five propylene monomer units are meso-bonded successively, in the polypropylene molecular chain, as measured by the method disclosed in A. Zambelli et al., Macromolecules, 6, 925 (1973), namely, by a method using $^{13}$C-NMR. NMR absorption peaks are assigned in accordance with the disclosure of Macromolecules, 8, 687 (1975). Specifically, the isotactic pentad fraction is determined as an area fraction of mmmm peaks in the whole peak area of methyl carbon ranges of a $^{13}$C-NMR spectrum. According to this method, the isotactic pentad fraction of an NPL standard substance, CRM No. M19-14 Polypropylene PP/MWD/2 available from NATIONAL PHYSICAL LABORATORY, G.B. was measured to be 0.944.

In view of the balance between the melt fluidity of the composition and the toughness of molded articles, the polymer component (I) preferably has an intrinsic viscosity $[\eta]P_{A-1}$ of 0.7 to 1.3 dl/g, and more preferably 0.85 to 1.1 dl/g.

The molecular weight distribution measured by gel permeation chromatography (GPC), which is sometimes referred to as Q value or Mw/Mn in the art, of the polymer component (I) preferably is 3 or more and less than 7, and more preferably is 3 to 5.

The weight ratio of propylene to ethylene contained in the copolymer component (II) of the block copolymer (A-1) (i.e., (the weight of propylene)/(the weight of ethylene)) preferably is from 70/30 to 50/50, and more preferably is from 65/32 to 55/45 from the viewpoint of the balance between the rigidity and the impact resistance of a molded article.

From the viewpoint of prevention of weld line occurrence, prevention of flow mark occurrence, and the balance between the rigidity and the impact resistance of a molded article, the intrinsic viscosity $[\eta]EP_{A-1}$ of the copolymer component (II) preferably is 4.0 dl/g or more to 5.5 dl/g or less, and more preferably is 4.5 to 5.3 dl/g.

From the viewpoint of the moldability of a resin composition and the impact resistance of a molded article, the crystalline propylene-ethylene block copolymer (A-1) preferably has a melt flow rate (henceforth, MFR), measured at a temperature of 230° C. and a load of 2.16 kgf in accordance with JIS K7120, of 10 to 120 g/10 min, and preferably 20 to 90 g/10 min.

The method for producing the propylene-ethylene block copolymer (A-1) may be, for example, a method comprising polymerizing monomers by using a conventional polymerization method and a catalyst system prepared by bringing (a) a solid catalyst component containing magnesium, titanium; halogen and electron donor as essential ingredients, (b) an organoaluminum compound, and (c) an electron-donating component into contact with each other. Methods for preparing such catalysts are disclosed, for example, in JP 1-319508 A, JP 7-216017 A, and JP 10-212319 A.

The method for producing the propylene-ethylene block copolymer (A-1) may be, for example, a method comprising a first step for producing a polypropylene portion and a second step, which is executed after the first step, for producing a propylene-ethylene random copolymer portion. Examples of the polymerization method include bulk polymerization, solution polymerization, slurry polymerization, and vapor phase polymerization.

These polymerization methods may be conducted either in a batch system or in a continuous system. Any combinations thereof are also available. From the viewpoint of industrial and economical advantages, vapor phase polymerization in a continuous system and a combination of bulk polymerization and vapor phase polymerization in a continuous system are preferred.

More specific examples of the production method include:

(1) a method which is carried out by the use of a polymerization apparatus having at least two polymerization vessels arranged tandem, wherein in the presence of the aforementioned catalyst system prepared by bringing (a) a solid catalyst component, (b) an organoaluminum compound, and (c) an electron-donating component into contact with each other, polypropylene is produced in the first polymerization vessel, followed by the transfer of the resulting polypropylene to the second polymerization vessel, and then a propylene-ethylene random copolymer is produced continuously in the presence of the polypropylene in the second polymerization vessel; and (2) a method which is carried out by the use of a polymerization apparatus having at least four polymerization vessels arranged tandem, wherein in the presence of the aforementioned catalyst system prepared by bringing (a) a solid catalyst component, (b) an organoaluminum compound, and (c) an electron-donating component into contact with each other, polypropylene is produced continuously in the first and second polymerization vessels, followed by the transfer of the polypropylene formed in the second polymerization vessel to the third polymerization vessel, and then a propylene-ethylene random copolymer component is produced continuously in the third and fourth polymerization vessels.

The amount of (a) the solid catalyst component, (b) the organoaluminum compound and (c) the electron donating component used in the aforementioned polymerization processes and the method for feeding the catalyst components into polymerization vessels may be determined appropriately with reference to methods of using conventional catalysts.

The polymerization temperature is −30 to 300° C., and more preferably is 20 to 180° C. The polymerization pressure is normal pressure to 10 MPa, and preferably is 0.2 to 5 MPa. As a molecular weight regulator, hydrogen, for example, may be used.

In the production of the propylene-ethylene block copolymer (A-1), preliminary polymerization may be conducted prior to the main polymerization. One example of known methods of pre-polymerization is a method in which pre-polymerization is carried out in a slurry state using a solvent while feeding a small amount of propylene in the presence of (a) a solid catalyst component and (b) an organoaluminum compound.

Additives may be added to the block copolymer (A-1). Examples of such additives include antioxidants, UV absorbers, lubricants, pigments, antistatic agents, copper inhibitors, flame retarders, neutralizing agents, foaming agents, plasticizers, nucleating agents, foam inhibitors, crosslinking agents, etc. In order to improve heat resistance, weather resistance or oxidation resistance of a resin composition, addition of an antioxidant or UV absorber is preferred.

The block copolymer (A-1) may also be a block copolymer obtained by subjecting a block copolymer prepared beforehand to a decomposing treatment by melt-kneading it in the presence of a peroxide.

The intrinsic viscosity $[\eta]_{EP-A}$ of the propylene-ethylene random copolymer portion contained in the block copolymer resulting from the decomposing treatment by the melt-kneading in the presence of a peroxide can be determined by measuring the intrinsic viscosity of the 20° C. xylene-soluble component of a pellet of the polymer resulting from the decomposing treatment. An organic peroxide is generally used as the peroxide, and the organic peroxide includes alkyl peroxides, diacyl peroxides, peroxyesters, and peroxycarbonates.

Examples of the alkyl peroxides include dicumyl peroxide, di-tert-butyl peroxide, di-tert-butyl cumyl peroxide, 2,5-dimethyl-2,5-di-(tert-butylperoxy)hexane, 2,5-dimethyl-2,5-di-(tert-butylperoxy)hexyne-3, tert-butyl cumyl, 1,3-bis(tert-butylperoxylsopropyl)benzene, and 3,6,9-triethyl-3,6,9-trimethyl-1,4,7-triperoxonane.

Examples of the diacyl peroxides include benzoyl peroxide, lauroyl peroxide, and decanoyl peroxide.

Examples of the peroxyesters include 1,1,3,3-tetramethylbutyl peroxyneodecanoate, α-cumyl peroxyneodecanoate, tert-butyl peroxyneodecanoate, tert-butyl peroxyneoheptanoate, tert-butyl peroxypivalate, tert-hexyl peroxypivalate, 1,1,3,3-tetramethylbutyl peroxy-2-ethylhexanoate, tert-amyl peroxyl-2-ethylhexanoate, tert-butyl peroxy-2-ethylhexanoate, tert-butyl peroxyisobutyrate, di-tert-butyl peroxyhexahydroterephthalate, tert-amyl peroxy-3,5,5-trimethylhexanoate, tert-butyl peroxy-3,5,5-trimethyl haxonoate, tert-butyl peroxyacetate, tert-butyl peroxybenzoate, and di-tert-butyl peroxytrimethyladipate.

Examples of the peroxycarbonates include di-3-methoxybutyl peroxydicarbonate, di(2-ethylhexyl) peroxydicarbonate, diisopropyl peroxycarbonate, tert-butyl peroxyisopropylcarbonate, di(4-tert-butylcyclohexyl) peroxydicarbonate, dicetyl peroxydicarbonate, and dimyristyl peroxydicarbonate.

The polypropylene resin (A) contained in the polypropylene resin composition of the present invention may be either the block copolymer (A-1) alone or a polymer mixture (A-3) comprising the block copolymer (A-1) and a propylene homopolymer (A-2). The content of the block copolymer (A-1) contained in the polymer mixture (A-3) is 30 to 99% by weight and the content of the homopolymer (A-2) is 1 to 70% by weight. It is preferable that the content of the block copolymer (A-1) and the content of the homopolymer (A-2) be 45 to 90% by weight and 55 to 10% by weight, respectively.

The homopolymer (A-2) preferably is a homopolymer having an isotactic pentad fraction of 97% or more, and more preferably is a homopolymer having an isotactic pentad fraction of 98% or more.

The MFR of the homopolymer (A-2) measured at a temperature of 230° C. and a load of 2.16 kgf in accordance with JIS K7120 is 10 to 500 g/10 min, and preferably is 40 to 350 g/10 min.

The method for producing the homopolymer (A-2) may be a method using a catalyst of the same type as that of the catalyst to be used for the production of the block copolymer (A-1).

When the total amount of the polypropylene resin (A), the ethylene-α-olefin copolymer rubber (B) and the inorganic filler (C) contained in the polypropylene resin composition of the present invention is let be 100 parts by weight, the content of the polypropylene resin (A) is 98 to 50 parts by weight, preferably is 90 to 55 parts by weight, and more preferably is 85 to 55 parts by weight, from the viewpoint of the rigidity and the impact strength of a molded article.

[Ethylene-α-Olefin Copolymer Rubber (B)]

The ethylene-α-olefin copolymer rubber (B) to be used in the present invention is an ethylene-α-olefin copolymer rubber (B) which comprises an α-olefin having 4 to 12 carbon atoms and ethylene and which has a density of 0.85 to 0.87 g/cm$^3$ and a melt flow rate, measured at a temperature of 230° C. and a load of 2.16 kgf in accordance with JIS K7210, of 0.05 to 20 g/10 min, Examples of the α-olefin having 4 to 12 carbon atoms include butene-1, pentene-1, hexene-1, heptene-1, octene-1, and decene. Butene-1, hexene-1 and octene-1 are preferred.

From the viewpoint of the impact strength, especially impact strength at low temperatures, of molded articles, the content of the α-olefin contained in the copolymer rubber (B) is from 20 to 50% by weight, and preferably is from 24 to 50% by weight, wherein the whole amount of the copolymer rubber (B) is let be 100% by weight.

Examples of the copolymer rubber include ethylene-butene-1 random copolymer rubber, ethylene-hexene-1 random copolymer rubber, and ethylene-octene-1 random copolymer rubber. Ethylene-octene-1 random copolymer rubber or ethylene-butene-1 random copolymer rubber are preferred. Two or more kinds of ethylene-α-olefin random copolymer rubbers may be used in combination.

From the viewpoint of good the balance between good rigidity and good impact resistance, the density of the copolymer rubber (B) is 0.85 to 0.87 g/cm$^3$, and preferably is 0.850 to 0.865 g/cm$^3$.

From the viewpoint of prevention of the occurrence of weld lines and good balance between rigidity and impact resistance, the melt flow rate (measured at a temperature of 230° C. and a load of 2.16 kgf) of the copolymer rubber (B) preferably is 0.05 to 1 g/10 min, and more preferably is 0.2 to 1 g/10 min.

The method for producing the copolymer rubber (B) may be a method such that it is produced by copolymerizing ethylene and an α-olefin using a conventional catalyst and a conventional polymerization method.

Examples of the conventional catalyst include catalyst systems comprising vanadium compounds and organoaluminum compounds, Ziegler-Natta catalyst systems, and metallocene catalyst systems. Examples of the conventional polymerization method include solution polymerization slurry polymerization, high-pressure ion polymerization and vapor phase polymerization. When the total amount of the polypropylene resin (A) the ethylene-α-olefin copolymer rubber (B) and the inorganic filler (C) contained in the polypropylene resin composition of the present invention is let be 100 parts by weight, the content of the copolymer rubber (B) is 1 to 25 parts by weight, and preferably is 3 to 23 parts by weight from the viewpoint of the rigidity and the impact strength of a molded article.

[Inorganic Filler (C)]

Examples of the inorganic filler (C) to be used for the present invention include calcium carbonate, barium sulfate, mica, crystalline calcium silicate, talc and fibrous magnesium oxysulfate. Talc or fibrous magnesium oxysulfate is preferred, and talc is more preferred. Two or more kinds of inorganic filler may be used in combination.

Talc is hydrous magnesium silicate, which has pyrophyllite-type three-layer crystal structure. The talc which is used preferably as the inorganic filler (C) in the present invention is a product obtained by grinding hydrous magnesium silicate. Preferable talc is composed of tabular particles prepared by finely grinding crystals of hydrous magnesium silicate molecules into a size almost as small as unit layers.

The average particle diameter of the granular inorganic filler to be used for the present invention preferably is 3 μm or less. The average particle diameter of a particulate inorganic filler means a 50% equivalent particle diameter D50 which is determined from an integral distribution curve by the sub-sieve method which is produced by measuring a suspension of the inorganic filler in a dispersing medium (e.g., water or alcohol) by means of a centrifugal sedimentation type particle size distribution analyzer.

The inorganic filler may be used either without being subjected to any treatment before use or with being treated on its surface with a conventional surfactant for the improvement in the interfacial adhesiveness to the polypropylene resin (A) or the dispersibility to the polypropylene resin (A). Examples of the surfactant include silane coupling agents, titanium coupling agents, higher fatty acids, higher fatty acid esters, higher fatty acid amides, and higher fatty acid salts.

The average fiber length of the fibrous inorganic filler to be used as the inorganic filler (C) preferably is from 5 to 50 μm, and more preferably is from 10 to 30 μm. The average diameter of the fibrous inorganic filler preferably is from 0.3 to 2 μm, and more preferably is from 0.5 to 1 μm. The average fiber diameter and the average fiber of a fibrous inorganic filler can be determined by randomly selecting 50 or more fibrous fillers in an image obtained by executing a scanning electron microscope (SEM) observation, subsequently measuring fiber diameters and fiber lengths, and then calculating their averages.

When the total amount of the polypropylene resin (A), the ethylene-α-olefin copolymer rubber (B) and the inorganic filler (C) contained in the polypropylene resin composition of the present invention is let be 100 parts by weight, the content of the inorganic filler (C) is 1 to 25 parts by weight, preferably is 7 to 23 parts by weight, and more preferably is 10 to 22 parts by weight, from the viewpoint of the rigidity and the impact strength of a molded article.

[Hindered Amine Light Stabilizer (D)]

The hindered amine light stabilizer (D) to be used in the present invention is a compound which satisfies the following, requirements (a), (b), and (c):

requirement (a): it has a 2,2,6,6-tetramethylpiperidyl group represented by formula (I);

requirement (b): it has an acid dissociation constant (pka) of less than 8;

requirement (c): the weight loss rate, as measured in an thermogravimetric analysis at a measurement temperature of 300° C. under a nitrogen gas atmosphere, is less than 10% by weight.

The hindered amine light stabilizer (D) preferably further satisfies requirement (d): the molecular weight is 1000 or more.

Regarding requirement (a), from the viewpoint of weather resistance, the 2,2,6,6-tetramethylpiperidyl group represented by formula (I) (i.e., a 2,2,6,6-tetramethyl-4-piperidyl group) preferably is attached to either an oxygen atom or a nitrogen atom in the compound having the group, and more preferably is attached to a nitrogen atom.

Regarding requirements (b), from the viewpoint of the weather resistance and the hue stability of a resin composition, the hindered amine light stabilizer (D) preferably has an acid dissociation constant (pka) of less than 8, and more preferably has a pka of 7 or less. The acid dissociation constant (pka) is an index which shows an intrinsic property of a compound having a 2,2,6,6-tetramethylpiperidyl group represented by formula (I) and it is determined by conventional titration.

Regarding requirement (c), from the viewpoint of the staining of a mold, the emitted amount of VOC, and the weather resistance, the weight loss rate measured in a thermogravimetric analysis at a temperature of 300° C. under a nitrogen gas atmosphere preferably is less than 5% by weight, and more preferably is less than 3% by weight. The weight loss rate measured by the thermogravimetric analysis of a hindered amine light stabilizer (D) to be used for the present invention is a value determined by using a thermo gravimetry differential thermal analyzer (TG-DTA). Described concretely, it is a weight loss rate determined using a thermobalance when the temperature of a hindered amine light stabilizer (D) is increased from room temperature to 300° C. at a rate of 10° C. per minute under a nitrogen gas atmosphere (in a nitrogen flow at a flow rate of 100 ml/min).

Regarding requirement (d), the molecular weight of the hindered amine light stabilizer (D) preferably is 1500 or more, and more preferably is 2000 or more from the viewpoint of the staining of a mold, the emitted amount of VOC and the weather resistance.

The hindered amine light stabilizer (D) preferably is a copolymer represented by formula (II) which is made from a maleic acid imide derivative:

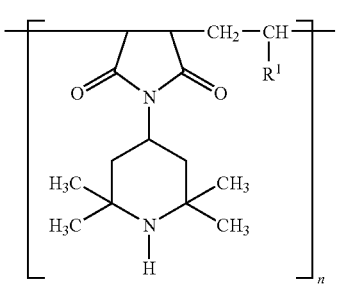

(II)

wherein R¹ represents an alkyl group having 10 to 30 carbon atoms and n represents an integer larger than 1.

The hindered amine light stabilizer (D) to be used for the present invention preferably is a light stabilizer represented by formula (II) wherein R¹ is an alkyl group having 14 to 28 carbon atoms, more preferably is a light stabilizer represented by formula (II) wherein R¹ is an alkyl group having 16 to 26 carbon atoms, and even more preferably is a light stabilizer represented by formula (II) wherein R¹ is an alkyl group having 18 to 22 carbon atoms. Such an alkyl group may be either a group having a linear structure or a group having a cyclic structure. Preferred is a linear alkyl group.

From the viewpoint of the weather resistance or anti-mold staining property of a resin composition and the balance between the appearance and the physical properties of a molded article, the content of the hindered amine light stabilizer (D) in the polypropylene resin composition of the present invention is 0.02 to 1 parts by weight, preferably is 0.05 to 0.5 parts by weight, and more preferably is 0.1 to 0.3 parts by weight to 100 parts by weight of the polypropylene resin (A), the ethylene-α-olefin copolymer rubber (B) and the inorganic filler (C) in total.

The hindered amine light stabilizer (D) may be use together with another light stabilizer (including hindered amine light stabilizers which fail to satisfy any of the requirements (a), (b) and (c)).

[Nonionic Antistatic Agent (E)]

Examples of the nonionic antistatic agent (E) to be used for the present invention include alkyldiethanolamines, alkyldiethanolamides, and their ester compounds, higher fatty acid glycerol esters, and diglycerol ester compounds. Mixtures of such compounds may also be used. From the viewpoint of exhibiting good antistatic performance, fatty acid monoglyceride or a mixture containing fatty acid monoglyceride as a main ingredient is preferable.

From the viewpoint of inhibiting mold staining, the weight loss rate of the nonionic antistatic agent (E) to be used for the present invention measured by thermogravimetric analysis executed at a temperature of 300° C. under a nitrogen atmosphere preferably is less than 20% by weight, and more preferably 5 to 15% by weight. The weight loss rate is determined by the use of a thermo gravimetry differential thermal analyzer (TG-DTA). Described concretely, it is a weight loss rate determined using a thermobalance when the temperature of the nonionic antistatic agent (E) is increased from room temperature to 300° C. at a rate of 10° C. per minute under a nitrogen gas atmosphere (in a nitrogen flow at a flow rate of 100 ml/min).

From the viewpoint of the antistatic property and the anti-mold staining property at the time of molding of a resin composition and the balance between the appearance and the mechanical properties of a molded article, the content of the nonionic antistatic agent (E) contained in the polypropylene resin composition of the present invention is 0.05 to 1 part by weight, preferably is 0.1 to 0.6 parts by weight, and more preferably 0.2 to 0.4 parts by weight relative to 100 parts by weight in total of the polypropylene resin (A), the ethylene-α-olefin copolymer rubber (B) and the inorganic filler (C).

[Others]

In order to further improve the balance of mechanical properties, the polypropylene resin composition of the present invention may contain a vinyl aromatic compound-containing rubber. Examples of the vinyl aromatic compound-containing rubber include block copolymers composed of a vinyl aromatic compound polymer and a conjugated diene polymer, and hydrogenated products of such block copolymers. The hydrogenation rate of the double bonds of the conjugated diene polymer portion preferably is 80% by weight or more, and more preferably is 85% by weight or more, provided that the overall amount of the double bonds contained in the conjugated diene polymer portion is let be 100% by weight.

The molecular weight distribution, measured by GPC, of the vinyl aromatic compound-containing rubber preferably is 2.5 or less, and more preferably is 1 to 2.3.

The content of the vinyl aromatic compound contained in the vinyl aromatic compound-containing rubber is preferably from 10 to 20% by weight, and more preferably from 12 to 19% by weight, based on the weight of the vinyl aromatic compound-containing rubber.

The MFR, measured at a temperature of 230° C. and a load of 2.16 kgf in accordance with JIS K7120, of the vinyl aromatic compound-containing rubber preferably is 0.01 to 15 g/10 min, and more preferably is 0.03 to 13 g/10 min.

Examples of the vinyl aromatic compound-containing rubber include block copolymers such as styrene-ethylene-butene-styrene rubbers (SEBS), styrene-ethylene-propylene-styrene rubbers (SEPS), styrene-butadiene rubbers (SBR), styrene-butadiene-styrene rubbers (SBS) and styrene-isoprene-styrene rubbers (SIS), and hydrogenated block copolymers produced by hydrogenation of the block copolymers listed above. Moreover, rubbers produced by causing a vinyl aromatic compound such as styrene to react with an ethylene-propylene-nonconjugated diene rubber are also mentioned as examples.

Two or more vinyl aromatic compound-containing rubbers may be used in combination.

The method for producing the vinyl aromatic compound-containing rubber is, for example, a method comprising linking a vinyl aromatic compound to an olefin-based copolymer rubber or a conjugated diene rubber by polymerization or reaction.

The polypropylene resin composition of the present invention may contain one or more additives unless the effect of the present invention is inhibited remarkably. Examples of such additives include neutralizing agents, antioxidants, processing stabilizers, UV absorbers, nucleating agents, transparentizable nucleating agents, antistatic agents, lubricants, processing aids, metallic soap, colorants (pigments such as carbon black and titanium oxide), foaming agents, antimicrobial agents, plasticizers, flame retarders, crosslinking agents, crosslinking aids, brightening agents, etc.

In particular, antioxidants are preferably used. An antioxidant is a compound which has an activity to prevent the decomposition of a polypropylene resin caused by heat, light, oxygen, or the like. Particularly in the present invention, an antioxidant is preferably used because it has a great effect on the reduction of the emitted amount of volatile organic compounds (VOC) and on the maintenance of the thermal stability, the weather resistance and the molding processability of a resin composition. Examples of antioxidants include phenolic antioxidants, phosphorus-containing antioxidants, sulfur-containing antioxidants and hydroxylamine-based antioxidants. In particularly preferable embodiments, a phenolic antioxidant is used.

A phenolic antioxidant having a molecular weight of 300 or more is used preferably as a phenolic antioxidant, and examples thereof include tetrakis[methylene-3-(3',5'-di-tert-butyl-4-hydroxyphenyl)propionate]methane, octadecyl-3-(3,5-di-tert-butyl-4-hydroxyphenyl)propionate, 3,9-bis[2-{3-(3-tert-butyl-4-hydroxy-5-methylphenyl)propionyloxy}-1,1-dimethylethyl]-2,4,8,10-tetraoxaspiro[5.5]undecane, triethylene glycol-N-bis-3-(3-tert-butyl-5-methyl-4-hydroxyphenyl)propionate, 1,6-hexanediol bis[(3-(3,5-di-tert-butyl-4-hydroxyphenyl)propionate)], 2,2-thiobis-diethylene bis[(3-(3,5-di-tert-butyl-4-hydroxyphenyl)propionate)], 1,3, 5-tris-2[3(3,5-di-tert-butyl-4-hydroxyphenyl)propionyloxy] ethyl isocyanate, 1,3,5-trimethyl-2,4,6-tris(3,5-di-tert-butyl-4-hydroxybenzyl)benzene, tris(3,5-di-tert-butyl-4-hydroxybenzyl)isocyanurate, and 1,3,5-tris (4-tert-butyl-3-hydroxy-2,6-dimethylbenzyl)isocyanurate.

Because a polypropylene resin composition and a molded article which are excellent in anti-mold staining property, the emitted amount of volatile organic compounds (VOC), thermal stability, weather resistance, moldability, and hue stability can be obtained, 3,9-bis[2-{3-(3-tert-butyl-4-hydroxy-5-methylphenyl)propionyloxy}-1,1-dimethylethyl]-2,4,8,10-tetraoxaspiro[5.5]undecane and tris(3,5-di-tert-butyl-4-hydroxybenzyl)isocyanurate are used preferably.

While the added amount of the phenolic antioxidant may be determined arbitrarily, it preferably is 0.01 to 1 part by weight to 100 parts by weight of the resin composition (I).

When a fatty acid metal salt is incorporated in the polypropylene resin composition of the present invention for the purpose of improvement in the processability or the improvement in the dispersibility of coloring pigments (pigments such as carbon black and titanium oxide), the content of the fatty acid metal salt preferably is 0.01 to 0.5 parts by weight, and more preferably is 0.01 to 0.2 parts by weight to 100 parts by weight of the resin composition (I) from the viewpoint of inhibiting mold staining. Examples of the fatty acid metal salt include calcium stearate, magnesium stearate, and zinc stearate.

In order to improve the stability against thermal oxidation and stability against light, it is preferable to incorporate a fatty acid amide selected from among fatty acid monoamides and fatty acid bisamides into the polypropylene resin composition of the present invention comprise. Examples of fatty acid amides which can be used include lauric acid amide, stearic acid amide, oleic amide, behenic acid amide, erucic acid amide, methylene bis stearyl amide, ethylene bis stearyl amide, ethylene bis oleyl amide, hexamethylene bis stearyl amide. The added amount of the fatty acid amide is 0.01 to 0.2 parts by weight, and preferably is 0.01 to 0.1 parts by weight relative to 100 parts by weight in total of the polypropylene resin (A), the ethylene-α-olefin copolymer rubber (B) and the inorganic filler (C). In a system containing an inorganic filler, the incorporation of a fatty acid amide can greatly improve the stability against thermal oxidation and the stability against light.

[Method for Producing Polypropylene Resin Composition]

The polypropylene resin composition of the present invention can be produced by a method comprising melt-kneading its ingredients together, for example, a method using a kneading machine such as a single screw extruder, a twin screw extruder, a Banbury mixer, and a hot roll. Examples of the melt-kneading machine to be used include single screw extruders, co-rotating twin screw extruders (e.g., ZSK [registered trademark] manufactured by Wernw Pfleideren, TEM [registered trademark] manufactured by Toshiba Machine Co., Ltd., TEX [registered trademark] manufactured by The Japan Steel Works, Ltd., and a twin screw kneader manufactured by Technovel Corporation.), counter-rotating twin screw extruders (e.g., CMP [registered trademark], TEX [registered trademark] manufactured by The Japan Steel Works, Ltd., FCM [registered trademark], NCM [registered trademark] and LCM [registered trademark] manufactured by Kobe Steel, Ltd.). The kneading temperature preferably is 170° C. to 250° C., and the kneading time preferably is 1 min to 20 min. The kneading of the ingredients may be performed either simultaneously or sequentially.

Examples of the method of kneading the ingredients separately include the following methods (1), (2), (3), and (4):

(1) A method which comprises kneading and then extruding the block copolymer (A-1) to produce pellets, and then kneading the pellets together with the copolymer rubber (B), the inorganic filler (C), the hindered amine light stabilizer (D), and the nonionic antistatic agent (E);

(2) A method which comprises kneading and then the block copolymer (A-1) to produce pellets, and then kneading the pellets together with the homopolymer (A-2), the copolymer rubber (B), the inorganic filler (C), the hindered amine light stabilizer (D), and the nonionic antistatic agent (E);

(3) A method which comprises kneading the block copolymer (A-1) and the copolymer rubber (B), and then adding the inorganic filler (C), the hindered amine light stabilizer (D) and the nonionic antistatic agent (E), followed by kneading;

(4) A method which comprises kneading the block copolymer (A-1) and the inorganic filler (C), and then adding the copolymer rubber (B), the hindered amine light stabilizer (D) and the nonionic antistatic agent (E), followed by kneading.

In the methods (3) or (4), a propylene homopolymer (A-2) may be added.

A method for incorporating the hindered amine light stabilizer (D) efficiently during the production of the polypropylene resin composition of the present invention includes a method in which a masterbatch resulting from melt-mixing the crystalline propylene-ethylene block copolymer (A-1) or the crystalline propylene homopolymer (A-2) and the hindered amine light stabilizer (D) to be used for the present invention or a high-concentration granule of the hindered amine light stabilizer (D) containing the hindered amine light stabilizer (D) at a concentration of 10 to 90% by weight resulting from the uniform mixing of the hindered amine light stabilizer (D), one or more additives and/or a polypropylene resin composed of a propylene-based polymer such as the polypropylene resin (A) to be used for the present invention is prepared first, and then the masterbatch or the granule is incorporated into a resin composition (I) to be used for the present invention.

[Method for Producing a Molded Article]

The molded article of the present invention is a molded article produced by molding the polypropylene resin composition of the present invention by a conventional molding method. Examples of the molding method include injection molding, press molding, vacuum forming, foam molding, and extrusion forming.

The molded article produced from the polypropylene resin composition of the present invention preferably is an injection molded article. The injection molding method includes normal injection molding, injection foam molding, supercritical injection foam molding, ultrahigh speed injection molding, injection compression molding, gas-assist injection molding, sandwich molding, sandwich foam molding and insert/outsert molding.

Preferable applications of the molded article of the present invention include injection molded articles for automobiles, examples of which include interior components such as door trims, pillars, instrument panels, consoles, rocker panel, arm rests, door panels and spare tire covers; and exterior components such as bumpers, spoilers, fenders and side steps.

EXAMPLES

The present invention is hereafter further explained on the basis of Examples, but the invention is not limited to the Examples.

The methods for measuring physical properties of the polymers and the compositions used in the Examples and the Comparative Examples are described below.

(1) Intrinsic Viscosity

Reduced viscosities were measured at three concentrations of 0.1, 0.2 and 0.5 g/dl using a Ubbelohde's viscometer. The intrinsic viscosity was calculated by the calculation method described in "Kobunshi Yoeki (Polymer Solution), Kobunshi Jikkengaku (Polymer Experiment Study) Vol. 11" page 491 (published by Kyoritsu Shuppan Co., Ltd., 1982), that is, by an extrapolation method by which reduced viscosities are plotted against concentrations and the concentration is extrapolated in zero. The measurement was carried out at a temperature of 135° C. using Tetralin as solvent.

(1-1) Intrinsic Viscosity of Propylene-Ethylene Block Copolymer (1-1a) Intrinsic Viscosity of a Polypropylene Portion: $[\eta]P$ The intrinsic viscosity $[\eta]_P$ of the polypropylene portion contained in a propylene-ethylene block copolymer is determined by the method described in the above item (1) using some polymer powder sampled from a polymerization vessel just after the first step preparation of the polypropylene portion during the production of the propylene-ethylene block copolymer.

(1-1b) Intrinsic Viscosity of Propylene-Ethylene Random Copolymer: $[\eta]_{EP}$ The intrinsic viscosity $[\eta]_P$ of the propylene homopolymer portion of a propylene-ethylene block copolymer and the intrinsic viscosity $[\eta]_T$ of the entire portion of the propylene-ethylene block copolymer were measured, respectively, by the method of the above item (1), and then the intrinsic viscosity $[\eta]_{EP}$ of the propylene-ethylene random copolymer portion contained in the propylene-ethylene block copolymer was calculated from the following formula using the weight ratio X of the propylene-ethylene random copolymer portion to the entire portion of the propylene-ethylene block copolymer.

(The weight ratio X to the propylene-ethylene block copolymer was determined by the measuring method (2) given below.)

$$[\eta]_{EP}=[\eta]_T/X-(1/X-1)[\eta]_P$$

$[\eta]_P$: Intrinsic viscosity (dl/g) of the propylene homopolymer portion $[\eta]_T$: Intrinsic viscosity (dl/g) of the propylene-ethylene block copolymer (2) Weight ratio X of a propylene-ethylene random copolymer portion to a whole propylene-ethylene block copolymer, and ethylene content [(C2')EP] of the propylene-ethylene random copolymer portion contained in the propylene-ethylene block copolymer The weight proportion of a propylene-ethylene random copolymer portion and the ethylene content [(C2')EP] of the propylene-ethylene random copolymer portion were determined from the $^{13}$C-NMR spectrum measured under the conditions given below, on the basis of the report of Kakugo et al. (Macromolecules 1982, 15, 1150-1152).

In a test tube having a diameter of 10 mm, about 200 mg of a propylene-ethylene block copolymer was dissolved uniformly in 3 ml of o-dichlorobenzene to yield a sample solution, which was measured for its $^{13}$C-NMR spectrum under the following conditions:
measurement temperature: 135° C.,
pulse repeating time: 10 seconds,
pulse width: 45°, and
the number of integrations: 2500.

(3) Isotactic Pentad Fraction (mmmm Fraction)

The isotactic pentad fraction is a fraction of units derived from propylene monomers which are each present at the center of an isotactic chain in the form of a pentad unit, namely a chain in which five propylene monomer units are meso-bonded successively, in the polypropylene molecular chain, as measured by the method reported in A. Zambelli et al., Macromolecules, 6, 925 (1973), namely, by a method using $^{13}$C-NMR. NMR absorption peaks were assigned in accordance with the disclosure of Macromolecules, 8, 687 (1975).

Specifically, an isotactic pentad fraction was obtained as an area fraction of mmmm peaks in the whole peak area of methyl carbon ranges of a $^{13}$C-NMR spectrum. According to this method, the isotactic pentad fraction of an NPL standard substance, CRM No. M19-14 Polypropylene PP/MWD/2 available from NATIONAL PHYSICAL LABORATORY, G.B. was measured to be 0.944.

[Preparation of Injection Molded Article]

Specimens, which were injection molded articles, for the evaluation of electrostatic property were produced by the following method. A flat article was obtained by the execution of molding by using, as an injection molding machine, an SE180D (clamping force=180 ton) manufactured by Sumitomo Heavy Industries Co., Ltd. and, as a mold, a mold for injection molding (with a single gate) having a cavity of 100 mm×400 mm×3.0 mm in size.

(1) Antistatic Property: Specific Surface Resistivity

For the evaluation of antistatic property, the specific surface resistivity (Ω) was measured according to the method provided in JIS K-6911. A specimen of 100 mm×100 mm×3 mm in size was punched out from the flat article produced by the above-mentioned method for producing an injection molded article, and its specific surface resistivity was measured using a digital insulation tester DSM-8103 (electrode: SME-8310) manufactured by DKK-TOA Corporation. When the specific surface resistivity was $1\times10^{15}\Omega$ or less, the antistatic property was judged as being excellent (expressed by sign (○), and when the specific surface resistivity exceeded $1\times10^{15}\Omega$, the antistatic property was judged as being insufficient (expressed by sign x).

(2) Mold Staining Property (2-1) Stained Mold Area

After the execution of continuous 60-shot injection molding at a molding temperature of 260° C. and a mold cooling temperature of 50° C. by the use of a mold for producing specimens of small-scale physical property test and an Si-30111 injection molding machine manufactured by Toyo Seiki Metal Co., Ltd., and measuring the area (mm$^2$) of a stained metal portion transferred to the fixed metal surface. The smaller the area of a stained mold portion, the better the anti-mold staining property was judged to be.

(2-2) Thermal Weight Loss Rate

The thermal weight loss rate was measured as an index of anti-mold staining property by the use of a thermogravimeter (TGAQ500 manufactured by TA instruments). Sample pellets were brought from room temperature to 220° C. at a rate of 50° C./min under a nitrogen gas atmosphere (under a nitrogen flow at a rate of 100 ml/min) and then were held at 220° C. for 150 min. Then, the weight loss rate was calculated from the sample weight before the heating and the sample weight after the heating. The smaller the thermal weight loss rate, the better the anti-mold staining property is judged to be, that is, the less the mold staining is caused.

(3) Weather Resistance

An accelerated weather resistance test was carried out by the use of a sunshine weather meter (Model 6XS-DCH) manufactured by Suga Test Instruments Co., Ltd. After a 1000-hour exposure, the presence or absence of appearance abnormalities, such as cracks on the test piece surface and the change in glossiness of the specimen were evaluated. The higher the gloss retention rate, the better the weather resistance is judged to be. In the present invention, the gloss retention rate is defined by a formula (glossiness before exposure to light/glossiness after exposure to light)×100. The test conditions are given below.

Size of specimen: a specimen (65 mm×60 mm×3 mm) cut out from an injection molded article of 70 mm×150 mm×3 mm (thickness).

Black panel temperature: 83° C.

Spray/dry cycle: 18 min/120 min

Humidity in testing machine bath: 50% RH

Observation of appearance abnormalities such as cracks: observation by a light microscope (100 magnifications)

Measurement of glossiness: measurement by a glossimeter (angle: 60°)

[Solid Catalyst Component (I)]

The method for preparing the solid catalyst component (I) used for the production of the polymers in Examples and Comparative Examples is described below.

A 200 liter cylindrical reactor (a reactor of 0.5 m in diameter equipped with a stirrer having three pairs of stirring blades of 0.35 m in diameter and four baffles of 0.05 m in width) was purged with nitrogen, and charged with 54 l of hexane, 100 g of diisobutyl phthalate, 20.6 kg of tetraethoxysilane and 2.23 kg of tetrabutoxytitanium, followed by stirring.

Then, to the stirred mixture, 51 l of a solution of butylmagnesium chloride in dibutyl ether (concentration: 2.1 mol/l) was dropped over 4 hours while the temperature in the reactor was kept at 7° C. The stirring rate at this time was 150 rpm. After the completion of the dropping, the mixture was stirred at 20° C. for 1 hour and then filtered. The resulting solid was washed with 70 l of toluene three times at room temperature, followed by addition of toluene to give a slurry of a solid catalyst component precursor.

The solid catalyst component precursor included Ti: 1.9 wt %, OEt (ethoxy group): 35.6 wt %, and OBu (butoxy group): 3.5 wt %. The average particle diameter was 39 μm, and the amount of fine powder of 16 μm or less was 0.5% by weight.

Subsequently, toluene was removed so that the volume of the slurry would become 49.7 l, and the remaining slurry was stirred at 80° C. for 1 hour. The slurry was then cooled to a temperature of 40° C. or lower, and thereafter a mixed solution of 30 l of tetrachlorotitanium and 1.16 kg of dibutyl ether was charged under stirring, followed by addition of 4.23 kg of orthophthaloyl dichloride. The temperature in the reactor was adjusted to 110° C. and stirring was conducted for 3 hours, followed by filtration. The solid collected was washed repeatedly with three 90-liter portions of toluene at 95° C. Toluene was added to form a slurry. After leaving at rest, toluene was extracted so that the slurry volume would become 49.7 liters. Then, a mixed solution of 15 liters of tetrachlorotitanium, 1.16 kg of dibutyl ether and 0.87 kg of diisobutyl phthalate was charged to the remaining slurry under stirring.

The temperature in the reactor was adjusted to 105° C. and stirring was conducted for 1 hour, followed by filtration. The solid collected was washed repeatedly with two 90-liter portions of toluene at 95° C. Toluene was added to form a slurry. After leaving at rest, toluene was extracted so that the slurry volume would become 49.7 liters. Then, a mixed solution of 15 liters of tetrachlorotitanium and 1.16 kg of dibutyl ether was charged to the remaining slurry under stirring.

The temperature in the reactor was adjusted to 105° C. and stirring was conducted for 1 hour, followed by filtration. The solid collected was washed repeatedly with two 90-liter portions of toluene at 95° C. Toluene was added to form a slurry. After leaving at rest, toluene was extracted so that the slurry volume would become 49.7 liters. Then, a mixed solution of 15 liters of tetrachlorotitanium and 1.16 kg of dibutyl ether was charged to the remaining slurry under stirring. The temperature in the reactor was adjusted to 105° C. and stirring was conducted for 1 hours, followed by filtration. The solid collected was washed repeatedly with three 90-liter portions of toluene and two 90-liter portions of hexane at 95° C. The resulting solid component was dried, yielding a solid catalyst component. The solid catalyst component contained 2.1% by weight of Ti and 10.8% by weight of phthalate component. This solid catalyst component is hereafter called "solid catalyst component (I)."

[Production of Polymers]

(1) Production of Propylene Homopolymer (A-2)

A propylene homopolymer was obtained by using the solid catalyst component (I) and controlling the hydrogen concentration and the polymerization temperature in the system of continuous vapor phase polymerization. The resulting polymer had an intrinsic viscosity $[\eta]_P$ of 0.93 dl/g, an isotactic pentad fraction of 0.984 and a molecular weight distribution of 4.3. The MFR was 120 g/10 min.

(2) Production of Propylene-Ethylene Block Copolymer (A-1)

A propylene-ethylene block copolymer was produced by a liquid phase-vapor phase multistage polymerization method using the solid catalyst component (I). A propylene homopolymer portion was produced in the first step and then a propylene-ethylene random copolymer portion was produced in the second step continuously by a liquid phase-vapor phase polymerization process having two steps. In a loop-type liquid phase polymerization reactor (the first vessel) made of SUS and a vapor phase polymerization reactor (the second vessel) made of SUS, a propylene homopolymer portion was produced while the hydrogen concentration and the polymerization temperature in the system were controlled. Subsequently, in a vapor phase polymerization reactor (the third vessel), a propylene-ethylene random copolymer portion was produced while propylene was supplied continuously so that the reaction temperature and the reaction pressure could be kept constant and hydrogen and ethylene were supplied so that the hydrogen concentration in the vapor phase and the ethylene concentration in the vapor phase could be kept constant.

The propylene homopolymer produced in the first step was sampled and analyzed. As a result, the intrinsic viscosities $[\eta]_P$ was 0.86 dl/g and the mmmm fraction was 0.987. The finally obtained propylene-ethylene block copolymer in whole had an intrinsic viscosities $[\eta]_{Total}$ of 1.40 dl/g. An analysis revealed that the content of propylene-ethylene random copolymer (EP content) was 12.3% by weight. Therefore, the intrinsic viscosity $[\eta]_{EP}$ of the propylene-ethylene random copolymer portion (EP portion) produced in the third reactor was determined to be 5.2 dl/g. Moreover, an analysis revealed that the ethylene content in the EP portion was 35% by weight and the MFR of the EP portion was 60 g/10 min.

[Pelletization of (A-1)]

0.05 Parts by weight of calcium stearate (produced by NOF Corporation.), 0.50 parts by weight of 3,9-bis [2-{3-(3-tert-butyl-4-hydroxy-5-methylphenyl)propionyloxy}-1,1-dimethylethyl]2,4,8,10-tetraoxaspiro[5.5]undecan e (SUMILIZER GA80, produced by Sumitomo Chemical Co., Ltd.) and 0.05 parts by weight of bis (2,4-di-tert-butylphenyl) pentaerythritol diphosphite (ULTRANOX U626, produced by GE Specialty Chemicals) as stabilizers were added to 100 parts by weigh of the propylene-ethylene block copolymer powder (A-1), followed by pelletization by means of an extruder.

[Light Stabilizer (Component (D))]

(D-1)

Product name: UVINUL 5050H, produced by BASF Japan, Ltd.

Sterically hindered amine oligomer

"Copolymer of N-(2,2,6,6-tetramethyl-4-piperidyl)maleic imide with C20-24 α-olefins"

Structural formula:

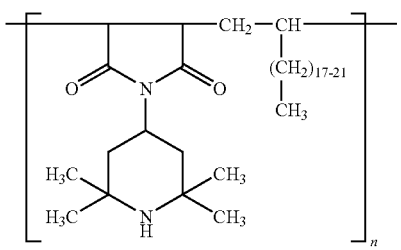

Molecular weight: 3500
pKa: 7.0
Weight loss rate by TG-DTA 2.2% by weight (D-2)

Product name: SANOL LS-770, produced by Sankyo Lifetech Co., Ltd.,

Chemical name: Bis(2,2,6,6-tetramethyl-4-piperidyl) sebacate

Structural formula:

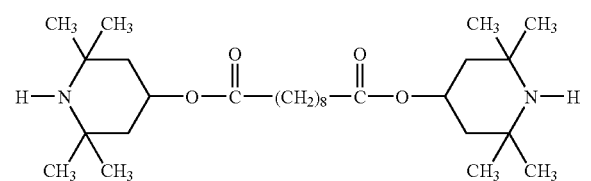

Molecular weight 481
pKa: 9.0
Weight loss rate by TG-DTA 19.6% by weight (D-3)

Product name: SUMISORB 400, produced by Sumitomo Chemical Co., Ltd.

Chemical name: 2,4-di-tert-butylphenyl 3,5-di-tert-butyl-4-hydroxybenzoate

Structural formula:

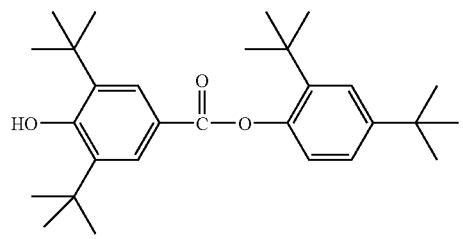

Molecular weight: 439
Weight loss rate by TG-DTA 31.6% by weight

The weight loss by thermogravimetric analysis (TG-DTA) of a light stabilizer was measured with a thermo gravimetry differential thermal analyzer from room temperature to 300° C. at a temperature increasing rate of 10° C./min under a nitrogen gas atmosphere (gas flow rate: 100 ml/min).

[Antistatic Agent (Ingredient (E))]

(E-1)

ELECTROSTRIPPER TS-5 produced by Kao Corporation.

Chemical name: Stearic acid monoglyceride

Weight loss rate by thermogravimetric analysis (TG-DTA): 23.8% by weight (E-2)

CB264A, produced by Toho Chemical Industry Co., Ltd.

Chemical name: Mixture of glycerol aliphatic acid ester, polyglyceryl fatty acid ester, alkyl diethanolamine, and alkyl diethanolamide Weight loss rate by thermogravimetric analysis (TG-DTA): 14.3% by weight The weight loss rate by thermogravimetric analysis (TG-DTA) is a value measured with a thermogravimetry differential thermal analyzer from room temperature to 300° C. at a temperature increasing rate of 10° C./min under a nitrogen gas atmosphere (gas flow rate: 100 ml/min).

Example 1

48% by weight of the (A-1) pellets, 10% by weight of propylene homopolymer (A-2) powder, 4% by weight of an ethylene-butene-1 random copolymer rubber, EBR-1 (density: 0.861 g/cm³, MFR (measured at 230° C. and a load of 2.16 kgf): 0.46 g/10 min), 8.3% by weight of an ethylene-octene-1 random copolymer rubber, EOR-1 (density: 0.857 g/cm³, MFR (measured at 230° C. and a load of 2.16 kgf): 2.7 g/10 min), 8.2% by weight of an ethylene-octene-1 random copolymer rubber, EOR-2 (density: 0.870 g/cm³, MFR (measured at 230° C. and a load of 2.16 kgf): 2.3 g/10 min), and 21.5% by weight of talc having an average particle diameter of 2.7 μm were compound at such proportions. In addition, to 100 parts by weight in total of the components (A-1), (A-2), (B) and (C), 0.05 parts by weight of calcium part by weight of 3,9-bis[2-{3-(3-tert-butyl-4-hydroxy-5-methylphenyl)propionyloxy}-1,1-dimethylethyl]-2,4,8,10-tetraoxaspiro[5.5] undecane (SUMILIZER GA80, produced by Sumitomo Chemical Co., Ltd.), 0.05 parts by weight of bis(2,4-di-tertbutylphenyl)pentaerythritol diphosphite (ULTRANOX U626, produced by GE Specialty Chemicals), 0.05 parts by weight of ethylene bisstearyl amide, 2.0 parts by weight of a black pigment masterbatch containing polypropylene, carbon black and fatty acid metal salt, 0.2 parts by weight of a light stabilizer (D-1), 0.1 parts by weight of a light stabilizer (D-2), and 0.4 parts by weight of an antistatic agent (E) were added at such incorporation proportions, and then were premixed uniformly with a tumbler. Subsequently, the mixture was kneaded and extruded at an extrusion rate of 70 kg/hr, 200° C., and a screw rotation speed of 300 rpm by the use of a twin screw kneading extruder (TEX 44αII-49BW-3V, manufactured by The Japan Steel Works, Ltd.) to give a polypropylene resin composition.

Example 2

Operations were carried out in the same manner as that in Example 1 except for adding 0.3 parts by weight of an antistatic agent (E-1).

Example 3

Operations were carried out in the same manner as that in Example-1 except for adding 0.4 parts by weight of antistatic agent (E-2) instead of the antistatic agent (E-1).

Example 4

Operations were carried out in the same manner as that in Example-1 except for adding 0.35 parts by weight of light stabilizer (D-1) and 0.4 parts by weight of antistatic agent (E-1).

Example 5

Operations were carried out in the same manner as that in Example-1 except for adding 0.35 parts by weight of light stabilizer (D-1) and 0.4 parts by weight of antistatic agent (E-2).

Comparative Example 1

Operations were carried out in the same manner as that in Example 1 except for changing the light stabilizer (D-1) to 0.2 parts by weight of light stabilizer (D-2) and 0.2 parts by weight of light stabilizer (D-3).

Comparative Example 2

Operations were carried out in the same manner as that in Example 1 except for changing the light stabilizer (D-1) to 0.2 parts by weight of light stabilizer (D-2) and 0.2 parts by weight of light stabilizer (D-3) and incorporating no antistatic agent. In Table 1 are given the incorporated proportions of light stabilizer (component D) and antistatic agent (component E) incorporated in Examples 1 to 5 and Comparative Examples 1 and 2, and the results of evaluation of the antistatic property, the anti-mold staining property and the accelerated weather resistance of the injection molded articles of the polypropylene resin compositions resulting from pelletization.

TABLE 1

| | | Example-1 | Example-2 | Example-3 | Example-4 | Example-5 | Comparative Example-1 | Comparative Example-2 |
|---|---|---|---|---|---|---|---|---|
| Component (D) | part by weight | 0.2 | 0.2 | 0.2 | 0.35 | 0.35 | 0 | 0 |
| D-1 | | 0.1 | 0.1 | 0.1 | 0 | 0 | 0.2 | 0.2 |
| D-2 | | 0 | 0 | 0 | 0 | 0 | 0.2 | 0.2 |
| D-3 | | | | | | | | |
| Component (E) | part by weight | 0.4 | 0.3 | 0 | 0.4 | 0 | 0.4 | 0 |
| E-1 | | 0 | 0 | 0.4 | 0 | 0.4 | 0 | 0 |
| E-2 | | | | | | | | |
| Antistatic property | | | | | | | | |
| Specific surface resistance | 0 | $5 \times 10^{13}$ | $1 \times 10^{14}$ | $2 \times 10^{14}$ | $2 \times 10^{13}$ | $1 \times 10^{14}$ | $8 \times 10^{13}$ | $2 \times 10^{16}$ |
| Judgment | | ○ | ○ | ○ | ○ | ○ | ○ | X |
| Anti-mold staining property | | | | | | | | |
| Stained mold area | mm² | 479 | 448 | 361 | 300 | 307 | 616 | 464 |
| Thermal weight loss rate | wt % | 0.57 | 0.47 | 0.51 | 0.39 | 0.29 | 0.90 | 0.60 |
| Accelerated weathering resistance | | | | | | | | |
| Presence of cracks | | No | | | No | No | No | |
| Gloss retention | % | 78 | | | 73 | 74 | 77 | |

INDUSTRIAL APPLICABILITY

According to the present invention, it is possible to provide a thermoplastic resin composition which does not produce mold staining very much at the time of molding, which is excellent in antistatic property, weather resistance, and molding processability, which has good balance between high rigidity and impact resistance, and which can give a molded article excellent in flow mark appearance and weld appearance when being processed into a molded article, and a molded article produced therefrom.

The invention claimed is:

1. A polypropylene resin composition comprising:
98 to 50 parts by weight of a polypropylene (A) comprising a propylene-ethylene block copolymer (A-1) or a polymer mixture containing a propylene-ethylene block copolymer (A-1) and a propylene homopolymer (A-2),
1 to 25 parts by weight of an ethylene-α-olefin copolymer rubber (B) which comprises an α-olefin having 4 to 12 carbon atoms and ethylene and which has a density of 0.85 to 0.87 g/cm³ and a melt flow rate, measured at a temperature of 230° C. and a load of 2.16 kgf in accordance with JIS K7210, of 0.05 to 20 g/10 min,
1 to 25 parts by weight of an inorganic filler (C),
0.02 to 1 part by weight of a hindered amine light stabilizer (D) which satisfies requirements (a), (b) and (c) given below,
0.05 to 1 part by weight of a nonionic antistatic agent (E), provided that the combined amount of the polypropylene resin (A), the ethylene-α-olefin copolymer rubber (B) and the inorganic filler (C) is let be 100 parts by weight:
requirement (a): it has a 2,2,6,6-tetramethylpiperidyl group represented by formula (I);

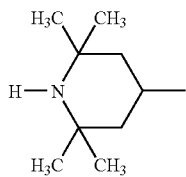

(I)

requirement (b): it has an acid dissociation constant (pka) of less than 8;
requirement (c): the weight loss rate, as measured in an thermogravimetric analysis at a measurement temperature of 300° C. under a nitrogen gas atmosphere, is less than 10% by weight.

2. The polypropylene resin composition of claim 1, wherein the hindered amine light stabilizer (D) further satisfies the following requirement (d):
Requirement (d): the molecular weight is 1000 or more.

3. The polypropylene resin composition of claim 1, wherein the hindered amine light stabilizer (D) is a copolymer having an maleic acid imide derivative component represented by formula (II):

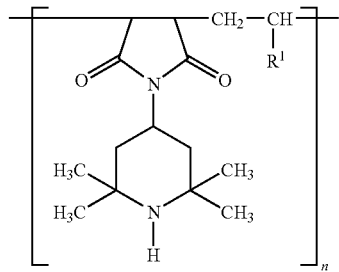

wherein R¹ represents an alkyl group having 10 to 30 carbon atoms and n represents an integer larger than 1.

4. The polypropylene resin composition of claim 1, wherein the nonionic antistatic agent (E) exhibits a weight loss rate of 20% by weight or less measured by thermogravimetric analysis at a temperature of 300° C. under a nitrogen gas atmosphere.

5. An injection molded article made of the polypropylene resin composition of claim 1.

6. The polypropylene resin composition of claim 2, wherein the hindered amine light stabilizer (D) is a copolymer having an maleic acid imide derivative component represented by formula (II):

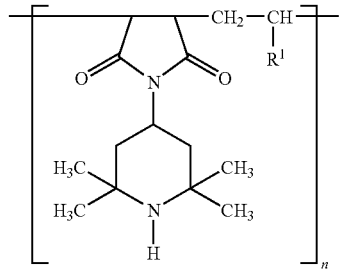

wherein R¹ represents an alkyl group having 10 to 30 carbon atoms and n represents an integer larger than 1.

7. The polypropylene resin composition of claim 2, wherein the nonionic antistatic agent (E) exhibits a weight loss rate of 20% by weight or less measured by thermogravimetric analysis at a temperature of 300° C. under a nitrogen gas atmosphere.

8. The polypropylene resin composition of claim 3, wherein the nonionic antistatic agent (E) exhibits a weight loss rate of 20% by weight or less measured by thermogravimetric analysis at a temperature of 300° C. under a nitrogen gas atmosphere.

9. An injection molded article made of the polypropylene resin composition of claim 2.

10. An injection molded article made of the polypropylene resin composition of claim 3.

11. An injection molded article made of the polypropylene resin composition of claim 4.

* * * * *